United States Patent
Ray, III et al.

(10) Patent No.: US 7,278,230 B2
(45) Date of Patent: Oct. 9, 2007

(54) CLEAN RELEASE MAGNET AND THE MANUFACTURING METHOD THEREOF

(75) Inventors: Thomas D. Ray, III, Birmingham, AL (US); Mark Mullaly, Birmingham, AL (US); Thommy W. Gill, Moody, AL (US); Randall D. Martin, Birmingham, AL (US); Robert J. Alden, Birmingham, AL (US)

(73) Assignee: RayPress Corporation, Birmingham, AL (US)

( * ) Notice: Subject to any disclaimer, the term of this patent is extended or adjusted under 35 U.S.C. 154(b) by 360 days.

(21) Appl. No.: 10/673,146

(22) Filed: Sep. 30, 2003

(65) Prior Publication Data

US 2004/0060217 A1    Apr. 1, 2004

(51) Int. Cl.
    *G09F 3/10* (2006.01)
(52) U.S. Cl. .................. 40/638; 40/312; 40/661.01
(58) Field of Classification Search ............ 40/312, 40/638, 661.01, 600; 283/81
    See application file for complete search history.

(56) References Cited

U.S. PATENT DOCUMENTS

| | | |
|---|---|---|
| 4,310,978 A | 1/1982 | Stern |
| 5,458,282 A | 10/1995 | Martin |
| 5,589,021 A | 12/1996 | Bloom |
| 5,641,116 A | 6/1997 | Martin |
| 5,676,307 A | 10/1997 | Martin |
| 5,699,956 A | 12/1997 | Brennan |
| 5,702,778 A | 12/1997 | Andonian |
| 5,769,457 A | 6/1998 | Warther |
| 5,868,498 A | 2/1999 | Martin |
| 5,984,091 A | 11/1999 | Orr et al. |
| 6,039,356 A | 3/2000 | Warther et al. |
| 6,113,148 A | 9/2000 | Koranda et al. |
| 6,153,279 A | 11/2000 | Charley |
| 6,153,280 A | 11/2000 | Uffmann |
| 6,273,660 B1 | 8/2001 | Ozgen et al. |
| 6,410,309 B1 | 6/2002 | Barbera-Guillem et al. |
| 6,428,869 B1 | 8/2002 | Ozgen et al. |
| 6,436,520 B1 | 8/2002 | Yamamoto |
| 6,472,037 B1 | 10/2002 | Kane |
| 2001/0042590 A1 | 11/2001 | Neuburger |
| 2002/0086138 A1 | 4/2002 | Iijima |
| 2002/0081446 A1 | 6/2002 | Boudouris et al. |

FOREIGN PATENT DOCUMENTS

JP    9-212095    8/1997

*Primary Examiner*—Gary C. Hoge
(74) *Attorney, Agent, or Firm*—Dykema Gossett PLLC

(57) ABSTRACT

The present invention includes a clean release magnet label and manufacturing method thereof. The clean release magnet includes a pressure sensitive carrier layer having a permanent adhesive applied to a first face and a clean release adhesive applied to a second face. A magnet layer is removably affixed to the pressure sensitive carrier layer with the clean release adhesive, and a filmic face layer, having printing thereon, is attached to the magnet layer with an adhesive. The method of manufacturing enables manual or automatic application of clean release magnets onto products. With this arrangement, the magnet layer is non-tacky when removed from the pressure sensitive carrier layer, the original product label is visible upon removal of the clean release magnet and the product contents remain free from contamination from the clean release magnet.

17 Claims, 4 Drawing Sheets

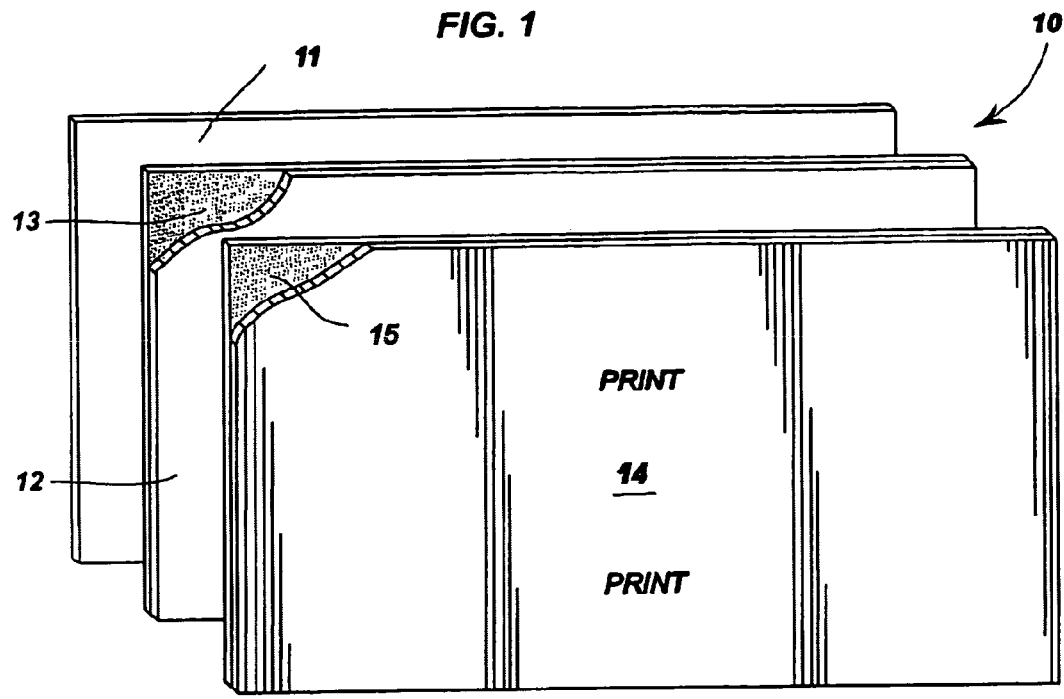
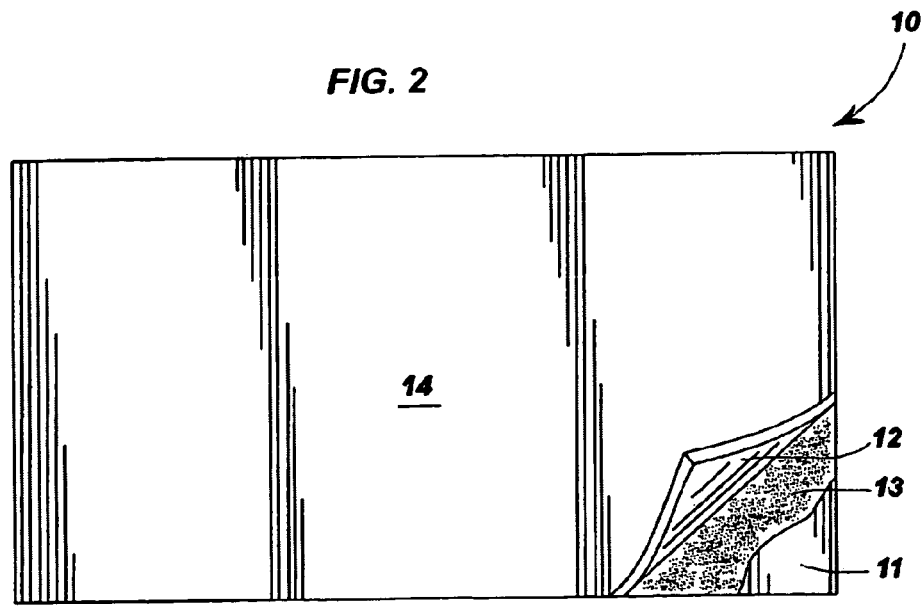

CLEAN RELEASE MAGNET AND THE MANUFACTURING METHOD THEREOF

RELATED APPLICATIONS

This application claims benefit of priority of application Ser. No. 10/180,084, filed Jun. 27, 2002.

BACKGROUND OF INVENTION a. Field of Invention

The invention relates generally a label and a manufacturing method thereof, and, more particularly to a label that is a clean release magnet, and a manufacturing method thereof.

b. Description of Related Art

A need exists for an improved label, having a magnet attached thereto, which may be efficiently and economically manufactured, and which may be adhered to a product and removed therefrom without damaging the product or obstructing the product label itself.

Magnetic labels are well known in the art and generally include advertising material printed on one side of label stock and a magnet permanently adhered to the other side. In use, magnetic labels are generally placed onto a metallic object and may serve the dual purpose of advertising a product, and securing paper and other such material underneath the magnetic label. Thus far, the usage potential of magnetic labels has been limited, in that the magnetic label typically requires a separate means of delivery to a customer than the advertised product itself. Moreover, if the magnetic label is affixed to an advertised product, removal of the label from the product in turn damages the product label itself, or may contaminate the product contents.

In the past, magnetic labels were generally manufactured by permanently adhering printed material onto a magnet and thereafter cutting the magnets to a desired size or shape. The conventional manufacturing methods of the past have had limited potential, in that once the magnetic labels have been cut, a seller generally has to separately distribute the magnetic label with each product. For products manufactured by the thousands or millions, such distribution requirements can significantly increase the overall cost of the product.

In the art, there currently exist various other conventional magnetic labels, as disclosed for example in U.S. Pat. Nos. 6,237,837, 6,037,029, 6,024,278, 6,024,277, 5,924,624, 5,868,498, 5,676,307, 5,641,116, 5,458,282 and 4,488,922. The magnetic labels disclosed therein include basic components such as a label or advertising material affixed to a magnet.

These conventional magnetic labels however have several of the same disadvantages and drawbacks of the conventional magnetic labels, as described above. Some of the key drawbacks generally include the limited usage potential, wherein the seller is required to deliver the labels separately with each product, or wherein removal of the label from a product damages the product label itself. Likewise, from a manufacturing standpoint, the labels described in the above-identified U.S. Patents also do not facilitate or reduce the cost of manufacturing and distribution of products with the labels.

SUMMARY OF INVENTION

The invention solves the problems and overcomes the drawbacks and disadvantages of the prior art by providing a magnetic label, which may be adhered to and removed from a product without damaging the product label itself.

Thus an aspect of the present invention is to avoid the need to separately distribute a magnetic label with a product.

Another aspect of the present invention is to provide a self adhering magnetic label, which may be affixed to the outside of a product packaging or container without contaminating the food products by the magnetic label and its components.

The invention accomplishes these aspects by providing a clean release magnet label including a pressure sensitive carrier layer having a permanent or a clean release adhesive applied to a first face, and a clean release adhesive applied to a second face. A flexible or rigid magnet layer may be removably affixed to the pressure sensitive carrier layer with the clean release adhesive, and a filmic face layer, having printing thereon, may be attached to the magnet layer with an adhesive. The clean release magnet label may be placed on a product, and upon removal of the magnet layer from the pressure sensitive carrier layer, the magnet layer is non-tacky and without any sticky residue, or may be slightly-tacky.

For the clean release magnet described above, the pressure sensitive carrier layer may be clear, opaque or have printing thereon, and have a backing layer removably attached to it. Alternatively, sections of the pressure sensitive carrier layer may be clear, opaque or have printing thereon. The pressure sensitive carrier layer may be substantially coextensive with the magnet layer and the filmic face layer, or may be substantially smaller than the magnet layer and/or the filmic face layer. The filmic face layer may be plain paper, embossed or glossy paper, PVC (Polyvinyl Chloride), PET (Polyethylene Terephlatate) or Tyvek, or other materials known in the art.

In an alternate embodiment of the clean release magnet, the present invention provides a clean release magnet label including 3-Σ LABEL STOCK having a label carrier layer with a self-adhesive backing layer for adhering to a product and a film layer disposed on the label carrier layer. The film layer has a permanent adhesive on a top surface and a dry release adhesive on a bottom surface. The dry release adhesive has a circular pattern with the adhesive being disposed outside circles in the circular pattern. The label carrier layer is adhered to the film layer by the dry release adhesive. A magnet layer is removably affixed to the 3-Σ LABEL STOCK with the permanent adhesive on the top surface of the film layer. When the magnet layer is removed from the label carrier layer, the film layer remains adhered to the magnet layer and the label carrier layer remains adhered to the product.

The present invention also provides a method of manufacturing a clean release magnet. The method includes the steps of printing information on a label layer having a self-adhering surface, thereby denoting a first layer. Next, a pressure sensitive carrier layer, having a clean release adhesive on a first surface and a permanent or clean release adhesive on a second surface, may be affixed to a magnet layer, to thereby denote a second layer. The pressure sensitive carrier layer may also include a backing layer. Thereafter the first layer may be affixed to the second layer, adjacent the magnet layer, to thereby denote a third layer. The third layer may then be cut, for example, by die-cutting to a predetermined depth. The predetermined depth may be defined by a distance from a top of the clean release magnet to a bottom of the clean release magnet, excluding a thickness of the backing layer. The clean release magnet may be manually or automatically placed on a product, and upon removal of the magnet layer from the pressure sensitive carrier layer, the magnet layer and the pressure sensitive carrier layer are non-tacky. For the cutting step, the third layer may be separated into a usable product matrix and a waste product matrix, and the waste product matrix may be discarded.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 1 is an exploded front elevation view of the clean release magnet of the present invention;

FIG. 2 is a front elevation view with a corner of the top layer of the clean release magnet of FIG. 1 pulled back to reveal the layers underneath;

DETAILED DESCRIPTION OF THE PREFERRED EMBODIMENT

Figure 5:
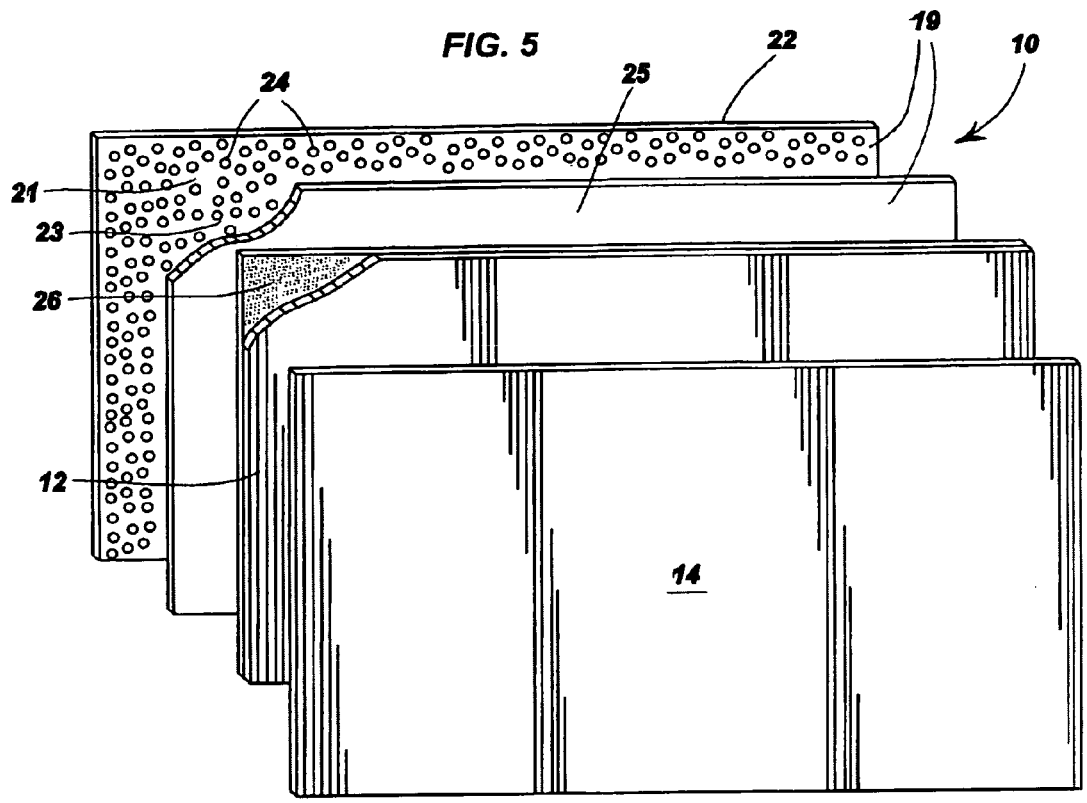
FIG. 5 is an exploded front elevation view of an alternative embodiment of the clean release magnet of the present invention.

As shown in FIG. 1, a clean release magnet according to the present invention, generally designated 10, may include a clear pressure sensitive carrier layer 11 having a permanent adhesive (not shown) applied to the back surface thereof so as to enable permanent affixation of clean release magnet 10 onto any type of product or item. Clear pressure sensitive carrier layer 11 may alternatively have a clean release adhesive (not shown) applied to its back surface, instead of the permanent adhesive.

As shown in FIG. 2, a flexible magnet 12 may be affixed to the clear pressure sensitive carrier layer 11 with a clean release adhesive 13. Clean release adhesive 13 allows flexible magnet 12 to be peeled off or removed from clear pressure sensitive carrier layer 11, without leaving a tacky or sticky residue on flexible magnet 12 or on the exposed surface of clear pressure sensitive carrier layer 11. Although layer 11 has been denoted as a clear pressure sensitive carrier layer, it should be evident that layer 11 may be clear, opaque or have printing thereon, or any combination thereof, as would be apparent to a skilled artisan. Moreover, it should be apparent that magnet 12 may be flexible or rigid.

Referring to FIG. 1, a printed filmic face 14 may be adhered to flexible magnet 12 with an adhesive layer 15 to allow for either removable or fixed attachment to flexible magnet 12. Printed filmic face 14 may be made of conventional label stock, such as plain paper, embossed or glossy paper, PVC (Polyvinyl Chloride), PET (Polyethylene Terephlatate), or Tyvek. Clear pressure sensitive carrier layer 11 may be substantially coextensive with flexible magnet 12 and/or printed filmic face 14 or instead may be substantially smaller than flexible magnet 12 and/or printed filmic face 14.

Figure 3:
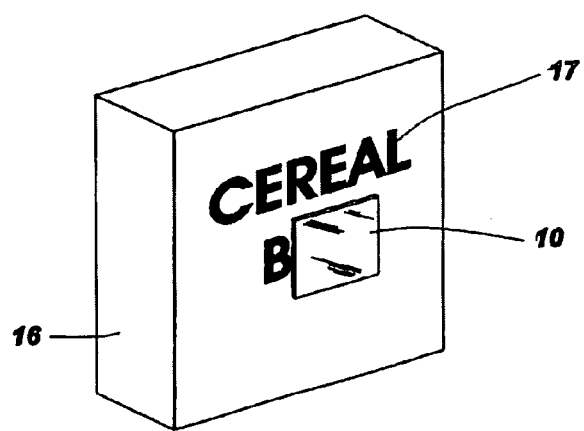
FIG. 3 is a front view of the clean release magnet of FIG. 1 attached to a product.

As shown next in FIG. 3, clean release magnet 10 may be permanently attached onto a product 16 by the permanent adhesive (not shown) on the back of clear pressure sensitive carrier layer 11. In use, clean release magnet 10 may be removed from product 16 and placed onto a metallic object (i.e. a refrigerator). As described above, it should be noted that when clean release magnet 10 is removed from clear pressure sensitive carrier layer 11, the back side of clean release magnet 10 and the front side of clear pressure sensitive carrier layer 11 are non-tacky.

Figure 4:
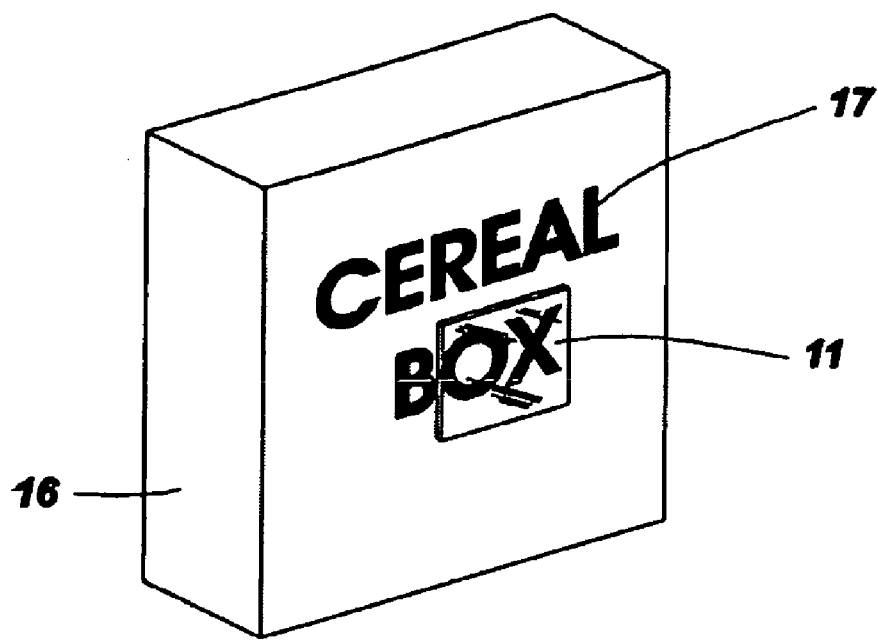
FIG. 4 is a front view of the clean release magnet removed from the product of FIG. 3.
Figure 7:
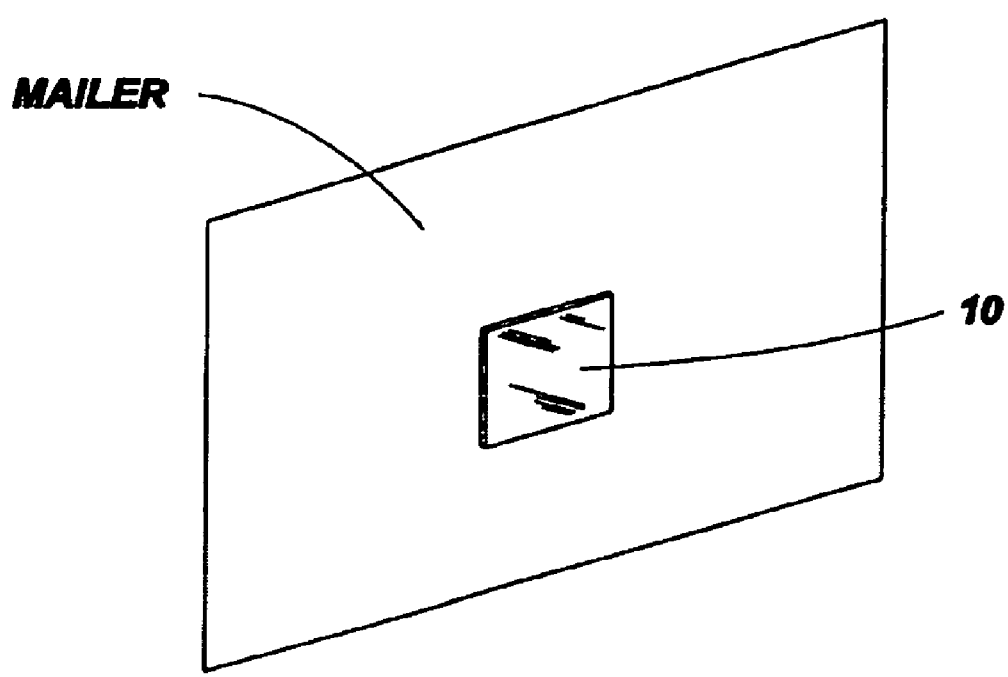
FIG. 7 is a front elevation view of the clean release magnet of FIG. 1, illustrating the clean release magnet affixed to a conventional mailer.
Figure 6:
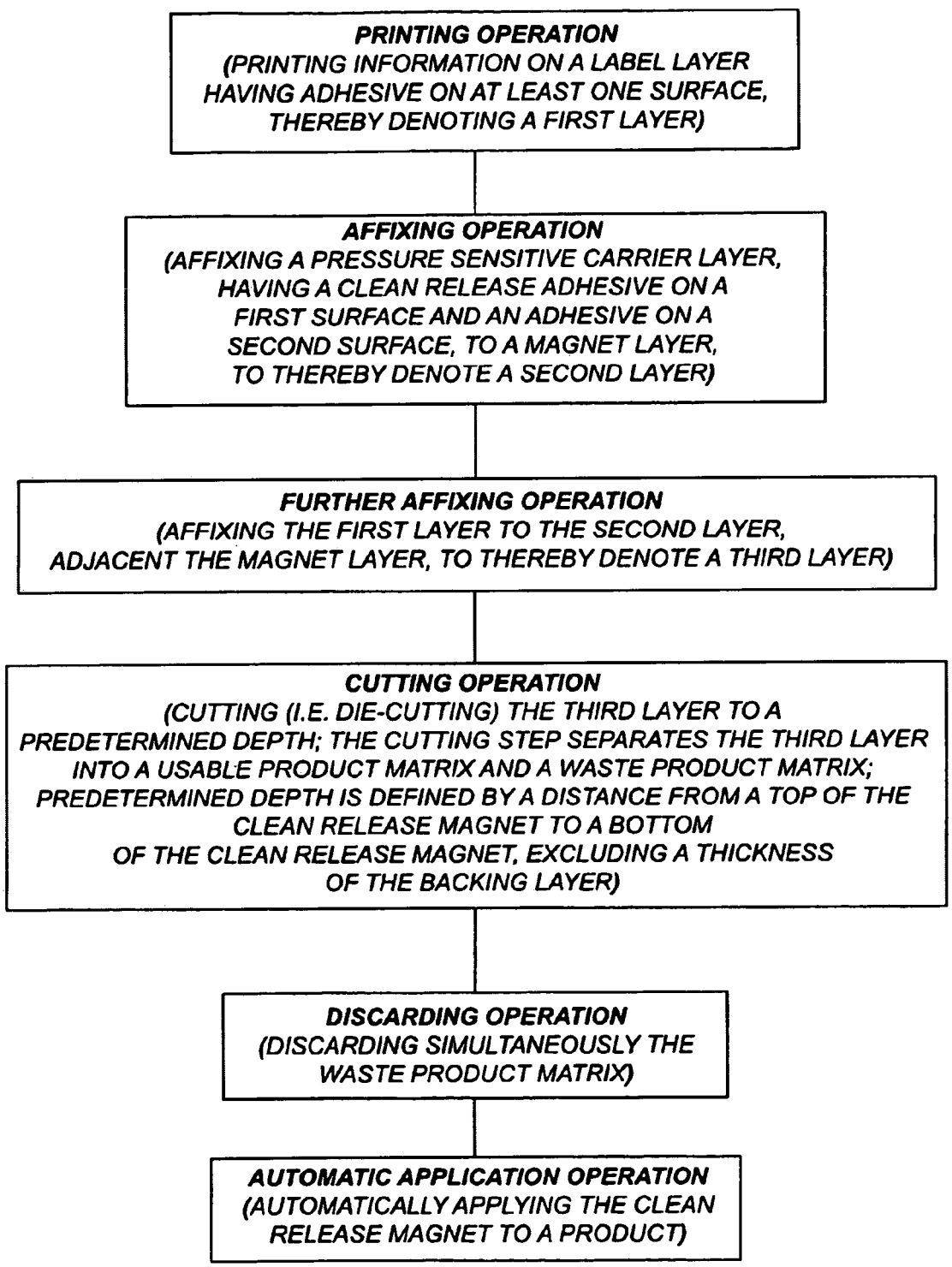
FIG. 6 is a flow-chart illustrative of the operational steps for manufacturing the clean release magnet of FIG. 1, and applying the clean release magnet to a product.

Referring next to FIG. 4, upon removal of clean release magnet 10 from product 16, any pre-printed label 17 on product 16 is visible through clear pressure sensitive carrier layer 11. Alternatively, if layer 11 is opaque or has printing thereon, clean release magnet 10 may be removed from product 16 to reveal the printing on layer 11.

An alternate embodiment of clean release magnet 10 will now be described in detail.

In the alternate embodiment of clean release magnet 10, instead of using clear pressure sensitive carrier layer 11 as discussed above, as shown in FIG. 5, 3-Σ LABEL STOCK may be used. 3-Σ LABEL STOCK, generally designated 19, consists of a standard label carrier 21 with a self adhesive backing layer 22 for permanent affixation to a product (not shown). The top of standard label carrier 21 has a clear film of dry-release glue 23 thereon disposed in a circular pattern 24. It should be noted that dry-release glue 23 is present on all areas of the surface of standard label carrier 21, except within the boundaries of the circles in circular pattern 24. A second layer of clear film 25, having a permanent adhesive layer 26 on its top surface, is affixed to standard label carrier 21 by dry-release glue 23. Flexible magnet 12 may be affixed to clear film 25 by permanent adhesive layer 26. The absence of dry-release glue 23 in the circles in circular pattern 24 facilitates removal of flexible magnet 12 affixed to clear film 25 from standard label carrier 21. Accordingly, when flexible magnet 12 is removed from the product, clear film 25 remains permanently affixed to flexible magnet 12 by permanent adhesive layer 26, and standard label carrier 21 remains affixed to the product. Therefore when flexible magnet 12 is removed from the product, clear film 25 affixed thereto has a "ghost image" of dry-release glue 23 outlined by circular pattern 24, and standard label carrier 21 affixed to the product also has a "ghost image" of dry-release glue 23 outlined by circular pattern 24.

For the alternate embodiment of clean release magnet 10 including the 3-Σ LABEL STOCK, instead of clear film 25 affixed to flexible magnet 12, film 25 may include printing thereon. Additionally, a coupon or game piece (not shown) may be overlaid on the top surface of standard label carrier 21 and/or the top surface of flexible magnet 12.

The manufacturing method for clean release magnet 10 will now be described in detail.

In order to manufacture clean release magnet 10, advertising or promotional materials, may be printed on a continuous roll of pressure sensitive, self-adhering label material (not shown), denoting a first roll made of printed filmic face 14, which is placed on a first spindle (not shown). The label material may have a pressure sensitive backing layer (not shown) and, as described above, may be made of conventional label stock, such as plain paper, embossed or glossy paper, PVC (Polyvinyl Chloride), PET (Polyethylene Terephlatate), or Tyvek. The label material may be retained on a roll (not shown) so as to be easily inserted into a machine (not shown) for subsequent processing. In the rolled configuration, the pressure sensitive backing on the label material may remain attached to the label material.

A roll of flexible magnet 12 and a roll of clear pressure sensitive carrier layer 11 having a backing layer (not shown), may be simultaneously fed through a machine so that flexible magnet 12 is affixed to the upper side of clear pressure sensitive carrier layer 11 by using clean release adhesive 13. The merged material may be re-wound onto a single roll, denoting a second roll, which is placed on a second spindle (not shown).

The rolls of printed filmic face 14 on the first spindle and flexible magnet 12 on the second spindle may then be simultaneously fed into the machine. As these rolls are fed into the machine, the pressure sensitive backing layer (not shown) on printed filmic face 14 is removed and printed filmic face 14 is applied to the top surface of flexible magnet 12 by virtue of adhesive layer 15 on printed filmic face 14. Thus, the rolls on the first and second spindles are "married" as they simultaneously go through the machine. As these rolls are fed through the machine, a calibrator (not shown) keeps register of the rolls, and the combination of materials described above on the "married" roll are also simultaneously die cut into desired shapes and sizes. The depth of the cut may extend through printed filmic face 14, flexible magnet 12 and clear pressure sensitive carrier layer 11 only, and not through the backing layer on clear pressure sensitive carrier layer 11. This cut divides the material of the "married" roll into a usable matrix and waste matrix. The waste matrix may be automatically stripped and rewound onto a waste roll (not shown) and the usable matrix made of the newly die cut material, including flexible magnets 12 affixed to clear pressure sensitive carrier layer 11, may come off the machine on another roll (not shown). Thus, in a single step, the rolls of printed filmic face 14 on the first spindle and flexible magnet 12 on the second spindle may be simultaneously fed into the machine, and a roll of newly die cut material, including printed filmic face 14 affixed to flexible magnets 12, which is in turn affixed to clear pressure sensitive carrier layer 11, may be output from the machine.

Alternatively, instead of the single step discussed above, the first roll including printed filmic face 14 may be merged with and adhered to the second roll of flexible magnet 12 and clear pressure sensitive carrier layer 11 to form a third roll (not shown) of the combination of materials.

Next, the third roll may be re-fed into the machine to die cut the combination of materials, described above, into desired shapes and sizes. As the third roll is die cut, the depth of the cut may extend through printed filmic face 14, flexible magnet 12 and clear pressure sensitive carrier layer 11 only, and not through the backing layer. Thus the cut divides the material of the third roll into a usable matrix and waste matrix.

The newly die cut material may then be rewound to form a fourth roll (not shown) and any of the waste matrix may be automatically discarded, leaving the individual printed die-cut clean release magnets 10 affixed on the backing layer.

The clean release magnets 10 created on the fourth roll, or created on the roll formed in the single step described above, may then be individually applied by hand or by machine at a rapid rate, for example, to a customer's product 16 to firmly attach clean release magnet 10 by the self-adhesive back side of clear pressure sensitive carrier layer 11. If clean release magnets 10 are applied by machine, the backing layer may be removed as waste and discarded.

As described above and as shown in FIGS. 3 and 4, when clean release magnets 10 is removed form the consumer product 16, clear pressure sensitive carrier layer 11 is left on the product 16. The exposed surfaces of clean release magnet 10 and clear pressure sensitive carrier layer 11 are clear and non-tacky (of slightly-tacky) so that any pre-printed label 17 on product 16 is un-obscured, and product 16 and clean release magnet 10 are easy to handle, respectively.

It should be apparent that the manufacturing method described above is only exemplary, and many other variations of the described method may be used to manufacture clean release magnet 10, as would be apparent to a skilled artisan.

For the above-described embodiments and manufacturing method of clean release magnet 10, it should be evident that clean release magnet 10 can be used for a variety of purposes and provides a consumer with a utilitarian and semi-permanent reminder of the product and brand name of the producer of the product. Clean release magnet 10 may be manually or automatically applied to, for example a postcard mailer, or the like. Moreover, since the clean release magnet is capable of being affixed to the inside or outside of the product packaging or container, from an FDA standpoint, it can be used with food products, thereby reducing concerns about contamination of the food products by the magnetic label and its components.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A method of manufacturing a clean release magnet, said method comprising the steps of:

printing information on a label layer having adhesive on at least one surface, thereby denoting a first layer;

affixing a pressure sensitive carrier layer, having a clean release adhesive on a first surface and an adhesive on a second surface, to a magnet layer, to thereby denote a second layer; and affixing said first layer to said second layer, adjacent said magnet layer, to thereby denote a third layer, and simultaneously cutting said third layer to a predetermined depth, wherein said magnet layer is one of non-tacky and slightly-tacky when removed from said pressure sensitive carrier layer, and a surface of said magnet layer is exposed when removed from said pressure sensitive carrier layer such that when said exposed surface is magnetically attached to a metal surface, said exposed surface directly contacts the metal surface.

2. A method according to claim 1, wherein said adhesive on said second surface is one of a permanent adhesive and a clean release adhesive.

3. A method according to claim 1, wherein said label layer is self-adhering.

4. A method according to claim 1, wherein said label layer is at least one of plain paper, embossed or glossy paper, PVC (Polyvinyl Chloride), PET (Polyethylene Terephlatate) and Tyvek.

5. A method according to claim 1, wherein said magnet layer is one of flexible and rigid.

6. A method according to claim 1, wherein said pressure sensitive carrier layer is one of clear, opaque and having printing thereon.

7. A method according to claim 1, wherein at least one section of said pressure sensitive carrier layer is at least one of clear, opaque and has printing thereon.

8. A method according to claim 1, wherein said pressure sensitive carrier layer has a releasable backing layer affixed thereto.

9. A method according to claim 8, wherein said predetermined depth is defined by a distance from a top of said clean release magnet to a bottom of said clean release magnet, excluding a thickness of said backing layer.

10. A method according to claim 1, wherein said cutting is performed by die-cutting said third layer.

11. A method according to claim 1, wherein said cutting step separates said third layer into a usable product matrix and a waste product matrix, said method further comprising the step of discarding simultaneously said waste product matrix.

12. A method according to claim 1, further comprising the step of automatically applying said clean release magnet to a product.

13. A method according to claim 12, wherein said product is a postcard mailer.

14. A method according to claim 1, wherein said steps of printing, affixing said pressure sensitive carrier layer, affixing said first layer and cutting are automatically performed by a machine.

15. A method of manufacturing a clean release magnet, said method comprising the steps of:

providing a label layer having adhesive on at least one surface, thereby denoting a first layer;

affixing a pressure sensitive carrier layer, having a clean release adhesive on a first surface and an adhesive on a second surface, to a magnet layer, to thereby denote a second layer; and affixing said first layer to said second layer, adjacent said magnet layer, to thereby denote a third layer, and simultaneously cutting said third layer to a predetermined depth, wherein said magnet layer is one of non-tacky and slightly-tacky when removed from said pressure sensitive carrier layer, and a surface of said magnet layer is exposed when removed from said pressure sensitive carrier layer such that when said exposed surface is magnetically attached to a metal surface, said exposed surface directly contacts the metal surface.

16. A method according to claim 15, wherein said adhesive on said second surface is one of a permanent adhesive and a clean release adhesive.

17. A method according to claim 15, further comprising the step of automatically applying said clean release magnet to a product.

* * * * *